(12) United States Patent
Rappoport et al.

(10) Patent No.: US 6,625,744 B1
(45) Date of Patent: Sep. 23, 2003

(54) CONTROLLING POPULATION SIZE OF CONFIDENCE ASSIGNMENTS

(75) Inventors: Lihu Rappoport, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/443,920

(22) Filed: Nov. 19, 1999

(51) Int. Cl.[7] .................................................. G06F 11/00
(52) U.S. Cl. ............................................... 714/2; 714/10
(58) Field of Search ................................ 714/2, 25, 26, 714/39, 34, 35, 10; 712/239, 240, 244, 233, 234; 709/103, 104

(56) References Cited

U.S. PATENT DOCUMENTS

| | | | | |
|---|---|---|---|---|
| 6,029,006 A | * | 2/2000 | Alexander et al. | 713/323 |
| 6,029,228 A | * | 2/2000 | Cai et al. | 711/137 |
| 6,041,405 A | * | 3/2000 | Green | 712/213 |
| 6,092,187 A | * | 7/2000 | Killian | 712/239 |
| 6,189,091 B1 | * | 2/2001 | Col et al. | 712/240 |
| 6,233,645 B1 | * | 5/2001 | Chrysos et al. | 710/244 |
| 6,308,322 B1 | * | 10/2001 | Serocki et al. | 717/145 |
| 6,324,616 B2 | * | 11/2001 | Chrysos et al. | 710/244 |
| 6,353,883 B1 | * | 3/2002 | Gruchowski et al. | 712/240 |
| 6,367,004 B1 | * | 4/2002 | Grochowski et al. | 712/226 |

OTHER PUBLICATIONS

Erik Jacobsen, et al.; Assigning Confidence to Conditional Branch Predictions; 1996 IEEE, Proceedings of the 29th Annual International symposium on Microarchitecture, Dec. 2–4, 1996, Paris, France.
James E. Smith; A Study of Branch Prediction Strategies; In Proceedings of the 8th International Symposium on Computer Architecture, 1981 IEEE; pp. 135–148.

* cited by examiner

Primary Examiner—Nadeem Iqbal
(74) Attorney, Agent, or Firm—Kenyon & Kenyon

(57) ABSTRACT

A method for dynamically controlling the population size of confidence assignments to which confidence level predictions are assigned. The method includes comparing a confidence level prediction and a threshold indication to generate a confidence assignment. The confidence assignment is used to generate another threshold indication. The threshold indication is dynamically adjusted so as to control the population size of confidence assignments to which confidence level predictions are assigned.

30 Claims, 8 Drawing Sheets

CONTROLLING POPULATION SIZE OF CONFIDENCE ASSIGNMENTS

FIELD OF THE INVENTION

The present invention pertains to the field of confidence predictions. More particularly, the present invention pertains to a method and mechanism for dynamically controlling the population size of confidence assignments to which confidence level predictions are assigned.

BACKGROUND OF THE INVENTION

Improvement in microprocessor performance has been partly due to the exploitation of parallelism among machine instructions. A parallel microprocessor that can concurrently execute instructions that are not dependent upon each other is likely to execute more instructions for a given cycle than a purely sequential microprocessor that does not take advantage of the lack of dependency (i.e., parallelism). However, there are limitations on the increase in performance that a parallel microprocessor will achieve over a purely sequential microprocessor. One limitation on the increase in performance achievable by parallel microprocessors is due to the uncertainties in the way branches will execute. When a microprocessor is faced with a branch instruction, it is uncertain whether the next instruction to be executed is the instruction after the branch (i.e., branch not taken) or the instruction at the branch target address (i.e., branch taken) until the microprocessor has evaluated (resolved) the branch's condition. There are at least two known ways to handle this uncertainty while improving performance and/or power savings over a purely sequential microprocessor that would have waited for the branch condition to be resolved before continuing execution: single-path speculative execution and eager execution.

In single-path speculative execution, when the microprocessor encounters a branch, the path that the branch will take is predicted, and execution proceeds down the predicted path. Since the branch is unresolved, all writes to architectural registers or memory and all I/O (Input/Output) operations must be made conditionally, and only finalized or committed if all previously speculated branches are predicted correctly. If there is a misprediction before a conditional operation, then that operation must not be committed, but squashed. Mispredictions affect both performance and power consumption. Power used to process the instructions along the mispredicted path is wasted.

Wasted power can be lessened by providing a confidence assignment for the confidence value of a prediction. If the confidence value exceeds a threshold, a high-confidence assignment is generated. If the confidence value is less than or equal to a threshold, a low-confidence assignment is generated. Branches are speculatively executed only if the confidence assignment is a high-confidence assignment. By setting the value of the threshold, the number of predictions that are given the high-confidence assignment can be controlled. If a branch has a low-confidence assignment, the processor does not execute the instructions on either path of the branch, but rather waits for the branch to be resolved. The processor may do something else (e.g., process another thread) while it waits for the branch to be resolved. Waiting for the branch to be resolved has an impact on performance, but saves power. Consequently, the measure of performance-per unit power consumed can increase. This measure is very important for mobile computers. Power consumption is a function of the observed ratio of low-confidence assignments to the total number of assignments (observed low-confidence ratio) which in turn is a function of the threshold value. However, there is a problem with simply setting the threshold to some value in order to achieve a desired ratio of low-confidence assignments to the total number of assignments (desired low-confidence ratio) and, thus, a desired power budget. Depending on the code being executed and runtime data, during a finite period of time, the observed low-confidence ratio may deviate from the desired low-confidence ratio. This deviation is undesirable because it means that the power budget is not being achieved during the period of time under examination.

In the second known method for handling branch uncertainty, eager execution, the microprocessor proceeds down both paths of a branch. Similar to single-path speculative execution, when a branch resolves, all of the states on the not-to-be-followed paths are discarded. Unfortunately, eager execution consumes microprocessor resources exponentially with the levels of pending branches. With unlimited resources, eager execution gives superb performance. With constrained resources, eager execution has a limited performance.

However, by providing a confidence assignment for a prediction associated with a branch it is possible to limit the amount of eager execution that occurs, thereby minimizing the unnecessary consumption of resources. By minimizing the unnecessary consumption of resources, it is possible to improve performance. Improvement in performance occurs because resources will only be expended on one path of the branch rather than two paths when a high-confidence assignment branch is encountered. Unfortunately, performance is a function of the number of high-confidence assignments that are produced out of a total number of confidence assignments. Depending on the code being executed and runtime data, during a finite period of time, the observed ratio of high-confidence assignments to the total number of confidence assignments may deviate from a desired ratio resulting in an undesirable impact on performance.

SUMMARY OF THE INVENTION

According to an embodiment of the invention a confidence assignment population control apparatus is provided. The apparatus includes a comparator that is to compare a current confidence level prediction and a current threshold indication and to generate a current confidence assignment. The apparatus includes a threshold generator that is to receive the current confidence assignment and to generate a next threshold indication.

DETAILED DESCRIPTION

Figure 1:
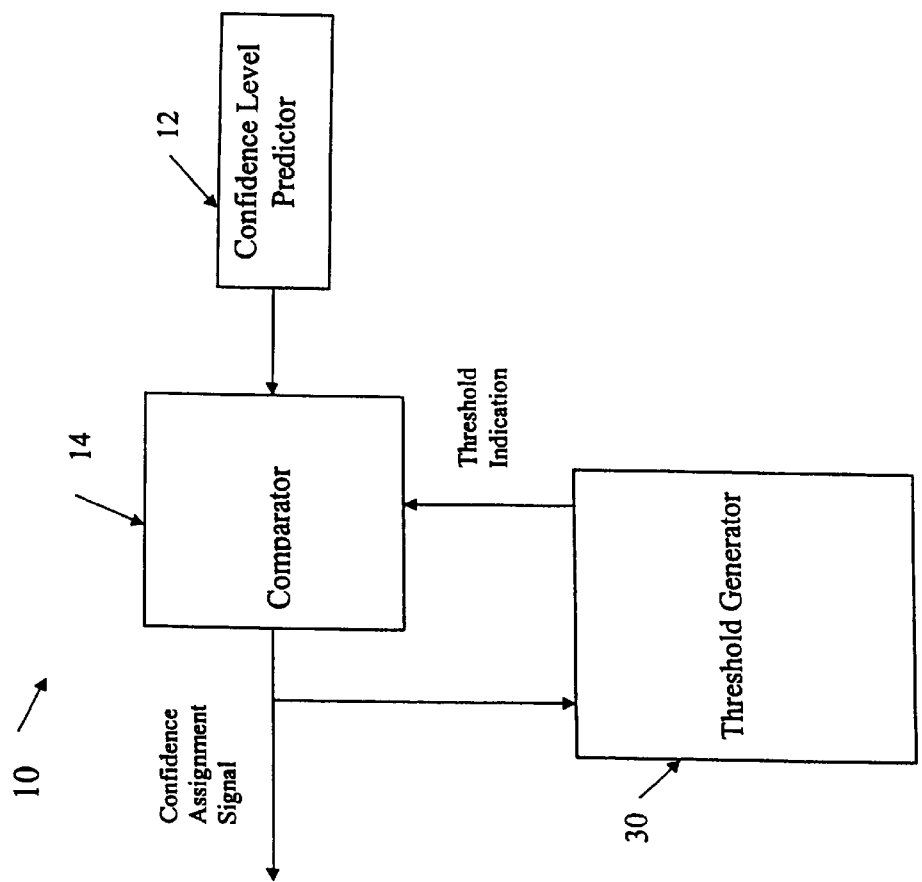
FIG. 1 is a block diagram of a confidence assignment population control apparatus according to an embodiment of the present invention.

A method and apparatus for dynamically adjusting the relative population size of confidence assignments are described below. In the following description, for purposes of explanation, numerous specific details are set forth in order to provide a thorough understanding of the present invention. It will be appreciated, however, by one skilled in the art that the present invention may be practiced without these specific details.

The present invention may be employed in conjunction with several types of predictors within an integrated circuit (e.g., a microprocessor). Examples of predictors with which the present invention may be practiced include a branch predictor, address predictor, or value predictor. Other examples of predictors to which the present invention can be applied should be appreciated by a person of ordinary skill in the art in light of the following description.

Generally speaking, a confidence level predictor provides a confidence value for the prediction of the occurrence of a certain event, e.g., branch will be taken (or not taken) by a microprocessor executing a conditional branch instruction. The confidence value provides an estimate of the likelihood that the prediction provided by a branch predictor is correct. Confidence level predictors have a variety of applications, including choosing among threads in a multi-threading processor, power savings, choosing among paths in single-path speculative execution, and choosing whether to perform or not perform eager execution. This invention may be practiced with a variety of predictors that can predict the probability of certain events happening. Accordingly, this invention should not be limited to the branch predictor described herein.

For a confidence level predictor of conditional branch instructions, the confidence level predictor generates a confidence value for a prediction (that a branch will be taken or not taken) received from a branch predictor. A confidence level predictor may be coupled to a device, such as a comparator, that compares the confidence value with a threshold indication to produce a confidence assignment. If the confidence value exceeds the threshold indication, a high-confidence assignment is generated. If the confidence value is less than or equal to the threshold indication, a low-confidence assignment is generated.

As a microprocessor encounters one conditional branch instruction after another, the confidence level predictor generates a confidence value for each prediction of the branch predictor. The comparator compares each confidence value with the threshold indication to generate a confidence assignment. Over a period of time, a sequence of confidence assignments will have been generated. For a variety of reasons, including power savings and/or maximizing performance of a microprocessor, it may be desirable to control the relative population size of low-confidence assignments in the sequence of confidence assignments. Over a program run, it may be desirable that the sequence of confidence assignments satisfy a predetermined relative population ratio (or rel_pop_size) of a total number of confidence level predictions marked as low-confidence assignments to a total number of confidence level predictions:

Total # of confidence level predictions marked as low-confidence/ Total number of confidence level predictions Where the relative population size of high-confidence assignments is being controlled, the rel_pop_size can be defined in terms of confidence level predictions marked as high-confidence assignments:

Total # of confidence level predictions marked as high-confidence/ Total number of confidence level predictions The rel_pop_size can have values between 0 and 1. It may be desirable to set rel_pop_size to a predetermined value in order to achieve power savings, performance objectives, or other objectives that depend upon the particular application of this embodiment of the present invention. Consequently, this invention is not to be limited to any particular value of rel_pop_size. A number similar to rel_pop_size can be defined for a finite sequence of confidence assignments that is actually generated (or observed) in a practical application (e.g., a microprocessor executing code having multiple branch instructions). Where the relative population size of low-confidence assignments is being controlled, it is useful to define the following as the observed relative population ratio (ob_rel_pop_size) of the sequence:

Observed # of confidence level predictions marked as low-confidence/Total number of confidence level predictions used in the sequence Where the relative population size of high-confidence assignments is being controlled, it is useful to define the following as the ob_rel_pop_size of the sequence:

Observed # of confidence level predictions marked as high-confidence/Total number of confidence level predictions used in the sequence Depending on the code being executed by a microprocessor and/or runtime data, over a finite span of branch instructions or time, the sequence of confidence assignments is likely to have an ob_rel_pop_size that fluctuates above and below rel_pop_size. This fluctuation may have an undesirable effect on power savings, performance, and/or other objectives. Having a fixed threshold may allow the fluctuations to become so large that the objectives are not achieved. Since the ob_rel_pop_size is a function of the number of low-confidence assignments and since the number of low-confidence assignments is controlled by the threshold indication, in this embodiment of the present invention the threshold indication is dynamically changed to control the number of low-confidence assignments, and, thereby control the ob_rel_op_size. Where the relative population size of low-confidence assignments is being controlled, if ob_rel_op_size is below rel_op_size, the threshold is raised, so more confidence values are marked as low-confidence assignments. If, on the other hand, ob_rel_pop_size is above rel_pop_size, the threshold is lowered, so less confidence values are marked as low-confidence assignments.

Where the relative population size of high-confidence assignments is being controlled, if ob_rel_pop_size is below rel_pop_size, the threshold is lowered, so more confidence values are marked as high-confidence assignments. If, on the other hand, ob_rel_op_size is above rel_pop_size, the threshold is raised, so more confidence values are marked as low-confidence assignments. While in the above description the parameters ob_rel_op_size and rel_pop_size are defined in terms of two confidence assignment population types, these parameters can also be defined in terms of three or more population types.

FIG. 1 is a block diagram of a confidence population control apparatus (control apparatus) 10 according to an embodiment of the present invention. In this embodiment, control apparatus 10 resides in a microprocessor configured for generation of confidence level predictions for conditional branch instructions. Control apparatus 10 comprises a confidence level predictor (CLP) 12, a comparator 14 coupled to CLP 12, and a threshold generator 30 coupled to comparator 14.

This invention can be practiced with a variety of predictors that can predict the probability of certain events happening. Accordingly, CLP 12 should not be limited to a confidence level predictor producing a confidence value for a prediction of a branch predictor.

Confidence level predictor 12 comprises a table of n-bit saturating-resetting counters (not shown). For each branch instruction, an appropriate counter in the table is selected (or indexed) by XORing the current branch instruction's instruction pointer address with the global history register. Another indexing scheme can use only the global history register. Other schemes for selecting counters are also possible, and are within the scope of this invention. When the branch condition is evaluated, the appropriate counter is updated. If the prediction for the branch were correct, the counter is incremented up to saturation. If the prediction for the branch were incorrect, the counter is reset. For a given branch instruction, the counter will hold the number of correct predictions (up to saturation) which were made since the last wrong prediction. For n-bit saturating counters, CLP 12 generates a value between 0 and $2^n-1$ (maximum confidence value or max_conf) for supply to comparator 14. In this embodiment, the value of n for the saturating counters in CLP 12 is 2 but other values can be used in other embodiments of this invention. The upper limit of a count performed by the counters is determined by the number of bits, n. For example, a 2-bit counter will count from 0 to 3, and will saturate at 3 if counting upwards, and at zero if counting downwards. For CLP 12 of the present embodiment, max_conf would be 3 for n equal to 2.

Comparator 14 receives a current confidence level prediction that a branch predictor will be correct from CLP 12. Comparator 14 also receives a current threshold indication from threshold generator 30. Initially, when the control apparatus 10 is first used, the current threshold indication is set to an initial value (init_threshold) between 0 and max_conf. Comparator 14 compares the current confidence level prediction and the current threshold indication to generate a current confidence assignment for supplying to threshold generator 30. The current confidence assignment is chosen from two confidence assignment population types, which include low-confidence assignments and high-confidence assignments. If the current confidence level prediction is less than or equal to the current threshold indication, the current confidence assignment generated by comparator 14 is a low-confidence assignment. If the current confidence level prediction is higher than the threshold indication, the current confidence assignment generated by comparator 14 is a high-confidence assignment.

Threshold generator 30 receives the current confidence assignment and generates a next (or another) threshold indication which comparator 14 uses to compare with the next confidence level prediction received from the CLP 12 for the next branch instruction. The next threshold indication generated depends upon whether control apparatus 10 is controlling the low-confidence assignment population or the high-confidence assignment population. While the following description is for the case where control apparatus 10 controls the low-confidence assignment population, control apparatus 10 may be used to control the high-confidence assignment as well.

Figure 2:
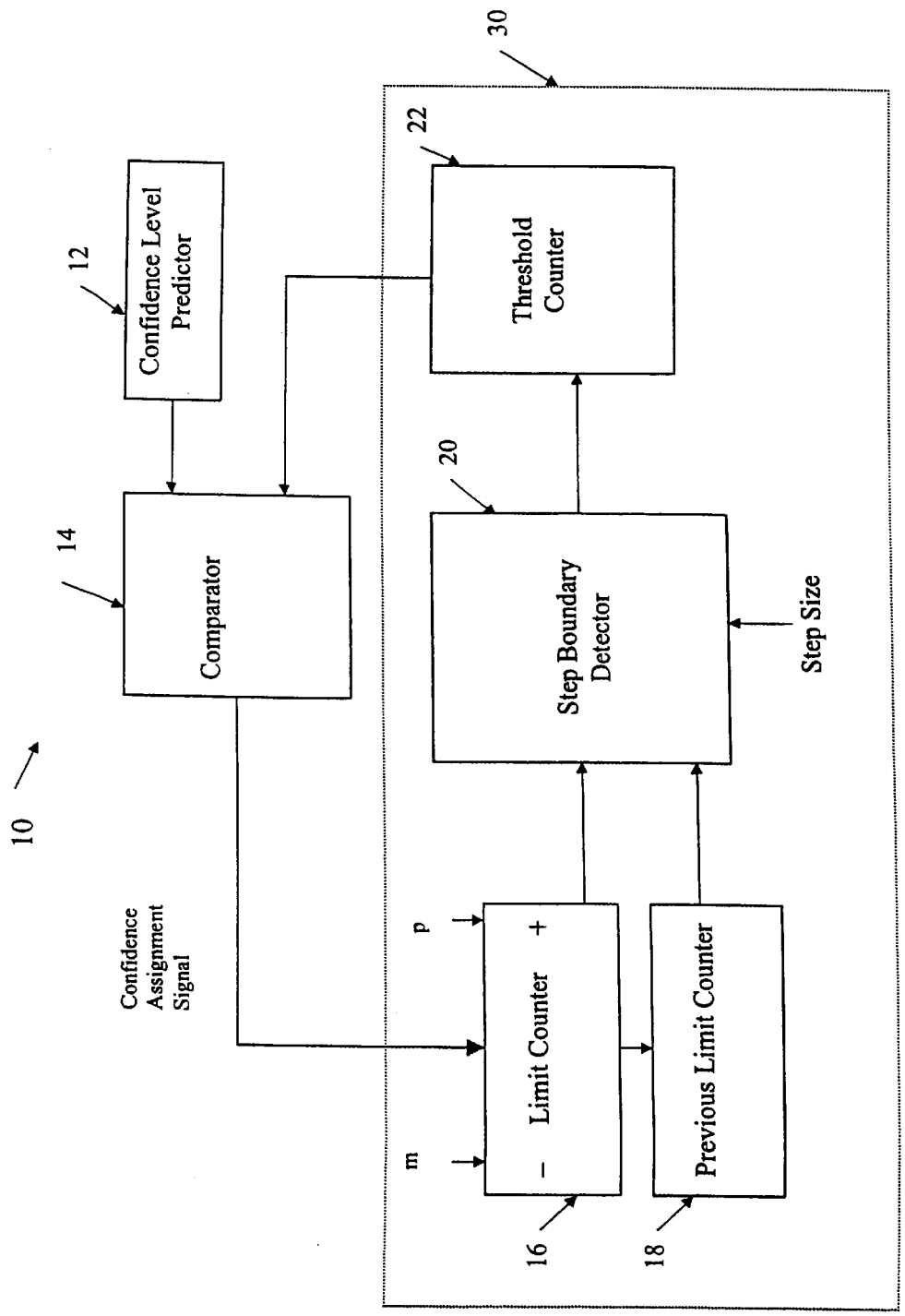
FIG. 2 is a more detailed block diagram of a confidence assignment population control apparatus according to an embodiment of the present invention.

FIG. 2 shows a more detailed block diagram of a confidence population control apparatus according to the present invention. A possible implementation of threshold generator 30 in accordance with this invention is shown in the portion of FIG. 2 enclosed within the dotted lines. In this embodiment, threshold generator 30 comprises a limit counter 16 coupled to comparator 14, a previous limit counter 18 coupled to limit counter 16, a step boundary detector (or step indicator) 20 coupled to limit counter 16 and previous limit counter 18, and a threshold counter 22 coupled to step boundary detector 20. Threshold counter 22 is also coupled to the comparator 14. From the description given herein, other implementations of the threshold generator 30 in accordance with the spirit of this invention would be appreciated by one of ordinary skill in the art and are encompassed by this invention.

Operation of the threshold generator 30 of one embodiment will now be described. For a variety of reasons, including maintenance of a power budget, it is desirable to have the ob_rel_pop_size for the confidence assignments generated by comparator 14 be equivalent or relatively close to rel_pop_size. As the number of branch instructions processed by CLP 12 approaches infinity during the execution of certain programs the ob_rel pop_size may approach rel_pop_size. However, for many programs and/or over a finite number of conditional branch instructions the ob_rel pop_size may fluctuate around rel_pop_size. Threshold generator 30 adjusts the threshold indication applied to comparator 14 so as to constrain the fluctuation of the ob_rel_pop_size. Threshold generator 30 raises the threshold indication in order to generate more low-confidence assignments, if the ob_rel_pop_size is below rel_pop_size. If, on the other hand, the ob_rel_op_size is above rel_pop_size, threshold generator 30 lowers the threshold indication in order to generate less low-confidence assignments. The manner in which the threshold indication is adjusted to achieve a desired rel_pop_size is described below.

Before control apparatus 10 can be used to control relative population size of a confidence assignment population type by adjusting the threshold indication, it is necessary to define some parameters and initialize some elements. For purposes of illustration, rel_op_size to be achieved by control apparatus 10 is selected to be 0.1. Other values for rel_pop_size can be chosen. For example, rel_pop_size can be set to certain values in order to limit wasted power. Threshold counter 22 is initialized to a value between 0 and max_conf. For purposes of illustration, threshold counter 22 is initialized to an initial value of 2. Limit counter 16 is also initialized with a value. The value used to initialize threshold counter 22 affects the choice of value used to initialize limit counter 16, as will be shown below. Similarly, the choice of value used to initialize limit counter 16 affects the choice of value used to initialize threshold counter 22.

Referring to FIG. 2, CLP 12 generates a confidence level prediction for application to comparator 14. Comparator 14 generates a current confidence assignment that can be either a low-confidence assignment or a high-confidence assignment. Limit counter 16 receives the low- or high-confidence assignment from comparator 14. Limit counter 16 maintains a count which approximates the difference between ob_rel_pop_size and rel_pop_size. For each confidence level prediction the count in limit counter 16 is decremented by a value m, and for each low-confidence assignment the count is also incremented by a value p. The confidence level prediction generated by CLP 12 is the triggering event for limit counter 16. The values of m and p can be stored in registers (not shown). Integers m and p are chosen such that m/p is equal to rel_pop_size. The count in limit counter 16 can range from a large positive number to a large negative number depending on the particular sequence of confidence assignments generated by comparator 14. If limit counter 16 is a saturating n-bit counter then the range for the count will be bounded by the size of limit counter 16 and its upper and lower bounds. Selection of an appropriate value for the bit-width n of limit counter 16 and previous limit counter 18 is described below. Before the count in limit counter 16 is adjusted by decrementing by p and incrementing by m if necessary (i.e., a low-confidence assignment was generated by comparator 14), the count in limit counter 16 is loaded into previous limit counter 18.

Assuming limit counter 16 starts with some initial value, for a given number of confidence assignments, the count in limit counter 16 after the last of the given number of assignments is processed will be one of the three following possibilities. First, if the ob_rel_pop_size is greater than rel_pop_size, the count in limit counter 16 will move up (the count right after the last of the given number of confidence assignments is processed will be higher than the count before the first of the given number of confidence assignments was processed). Second, if the ob_rel_pop_size is less than rel_pop_size, the count in limit counter 16 will move down (the count right after the last of the given number of confidence assignments is processed will be lower than the count before the first of the given number of confidence assignments was processed). Third, if the ob_rel_pop_size is equal to the rel_pop_size, the count in limit counter 16 will remain at the initial value (the count right after the last of the given number of confidence assignments is processed will be the same as the count before the first of the given number of confidence assignments was processed). It should be appreciated from the three possibilities that limit counter 16 maintains a count that is a relative indication of the difference between ob_rel_pop_size and rel_pop_size (a first relative indication). The count maintained by limit counter 16 includes the current confidence assignment. The values of m and p are chosen such that m/p is equal to rel_pop_size in order to ensure that the ob_rel_op_size is close to rel_op_size.

The step boundary detector 20 receives the count in limit counter 16 after adjustment and the count in previous limit counter 18 (or the second relative indication). The step boundary detector 20 also receives as an input the value of a step_size (or step size signal). The step_size can be stored in a register (not shown). The step_size applied to boundary detector 20 is set to (1/rel_pop_size)*step_factor, where step_factor can be some number such that step size is an integer. Assuming step factor is selected to be 5 and rel_op_size is set to 0.1, step size will be 50. The step boundary detector 20 divides the entire range of the contents of limit counter 16 into non-overlapping sub-ranges or steps each of which is equivalent to the step_size. The step boundary detector 20 determines in which sub-range or sub-ranges the contents of limit counter 16 and the contents of previous limit counter 18 are located. The bit-width n of limit counter 16 and previous limit counter 18 is determined by the smallest value for n that satisfies the following relationship:

$$2^{n-1} \geq (\text{step\_size} * \text{max\_conf})$$

Figure 3:
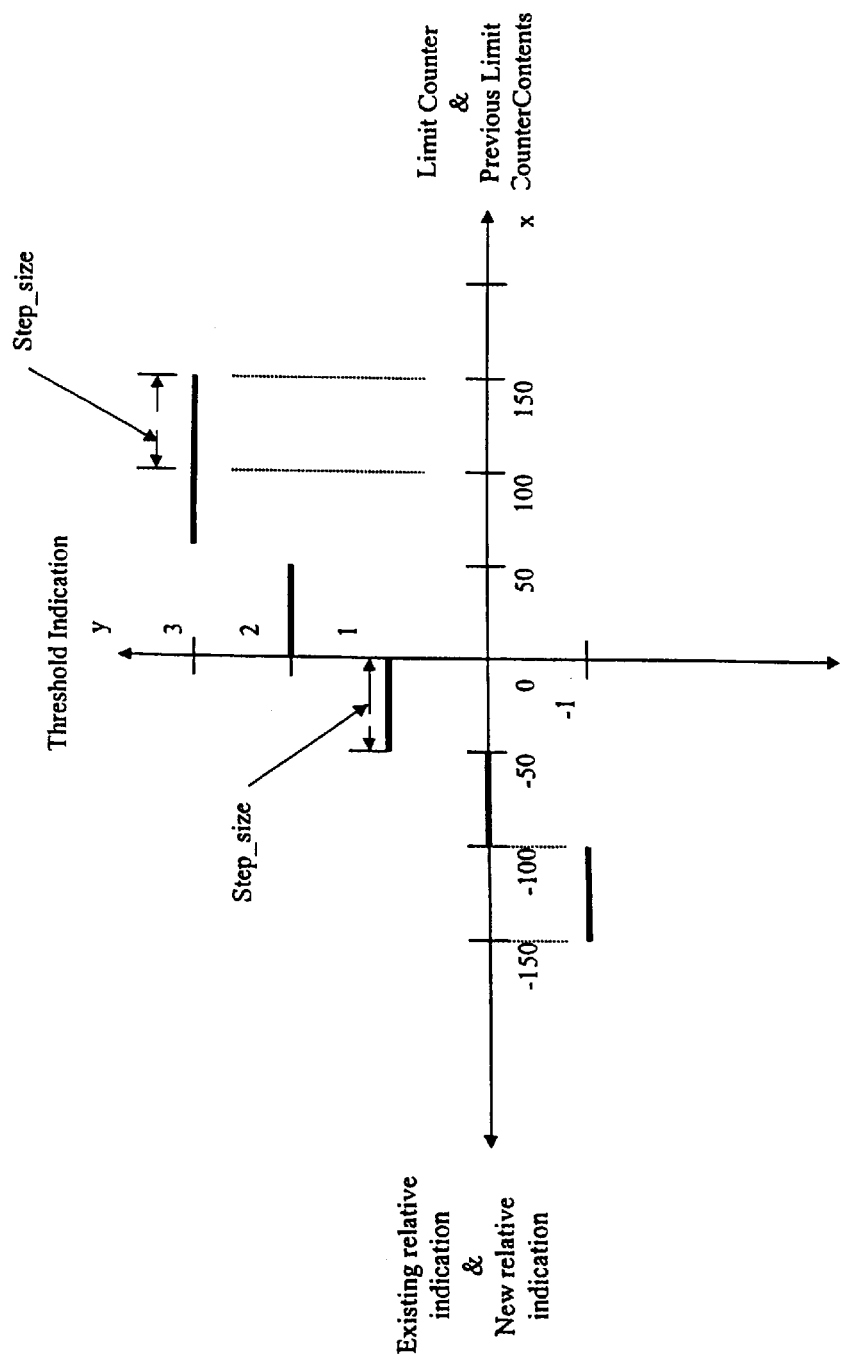
FIG. 3 is a diagram illustrating the relationship between four values used in controlling a confidence assignment population for an embodiment in accordance with this invention.

FIG. 3 illustrates the relationship between the contents of limit counter 16 and the sub-ranges into which the contents are divided. A sub-range to the left of another sub-range is considered "lower" (or lesser) than the sub-range to its right. Conversely, the sub-range to the right of another sub-range is considered "higher" (or higher) than the sub-range to its left. The left-most sub-range 40 is limited for saturating limit counter 16. Similarly, the right-most sub-range 50 is limited for saturating limit counter 16. The y-axis of the graph in FIG. 3 indicates the threshold indication associated with each sub-range. The step boundary detector 20 generates a step signal to decrement the threshold counter 22 if the contents of limit counter 16 are in a sub-range that is higher than the sub-range in which the contents of previous limit counter 18 lie. Step boundary detector 20 generates a step signal to maintain the contents of threshold counter 22 at their present value if the contents of limit counter 16 are in the same sub-range as the contents of previous limit counter 18. Step boundary detector 20 generates a step signal to increment threshold counter 22 if the contents of limit counter 16 are in a sub-range that is lower than the sub-range in which the contents of previous limit counter 18 lie. It should be appreciated that for a very large step size, the contents of limit counter 16 can grow to a large value before the contents cross from a lower sub-range into a higher sub-range causing the boundary detector 20 to generate a step signal to increment. In other words, a large step_size means that the ob_rel_pop_size can deviate substantially from rel_pop_size before a step signal to increment or decrement is generated by boundary detector 20. A small step size means that the ob_rel_op_size can deviate a small amount from rel_pop_size before a step signal to increment or decrement is generated by boundary detector 20.

Threshold counter 22 receives the step signal and generates a threshold indication for application to comparator 14. Comparator 14 uses the threshold indication to generate a confidence assignment for the next confidence level prediction received from CLP 12. It should be appreciated from the foregoing that FIG. 3 illustrates the relationship between four values used in controlling the population size of confidence assignments. The four values are the step size, the threshold indication, the contents of limit counter 16, and the contents of previous limit counter 18.

Returning to the initialization of the contents of limit counter 16, since the initial value of the threshold counter is 2, looking at FIG. 3 it should be appreciated that the contents of limit counter 16 should be initialized to some value in the range between 0 and 50. Alternatively, the contents of limit counter 16 can be initialized to some other value and based on that initialization the corresponding initial value of the contents of threshold counter 22 can be determined from a graph such as the one illustrated in FIG. 3.

Figure 4:
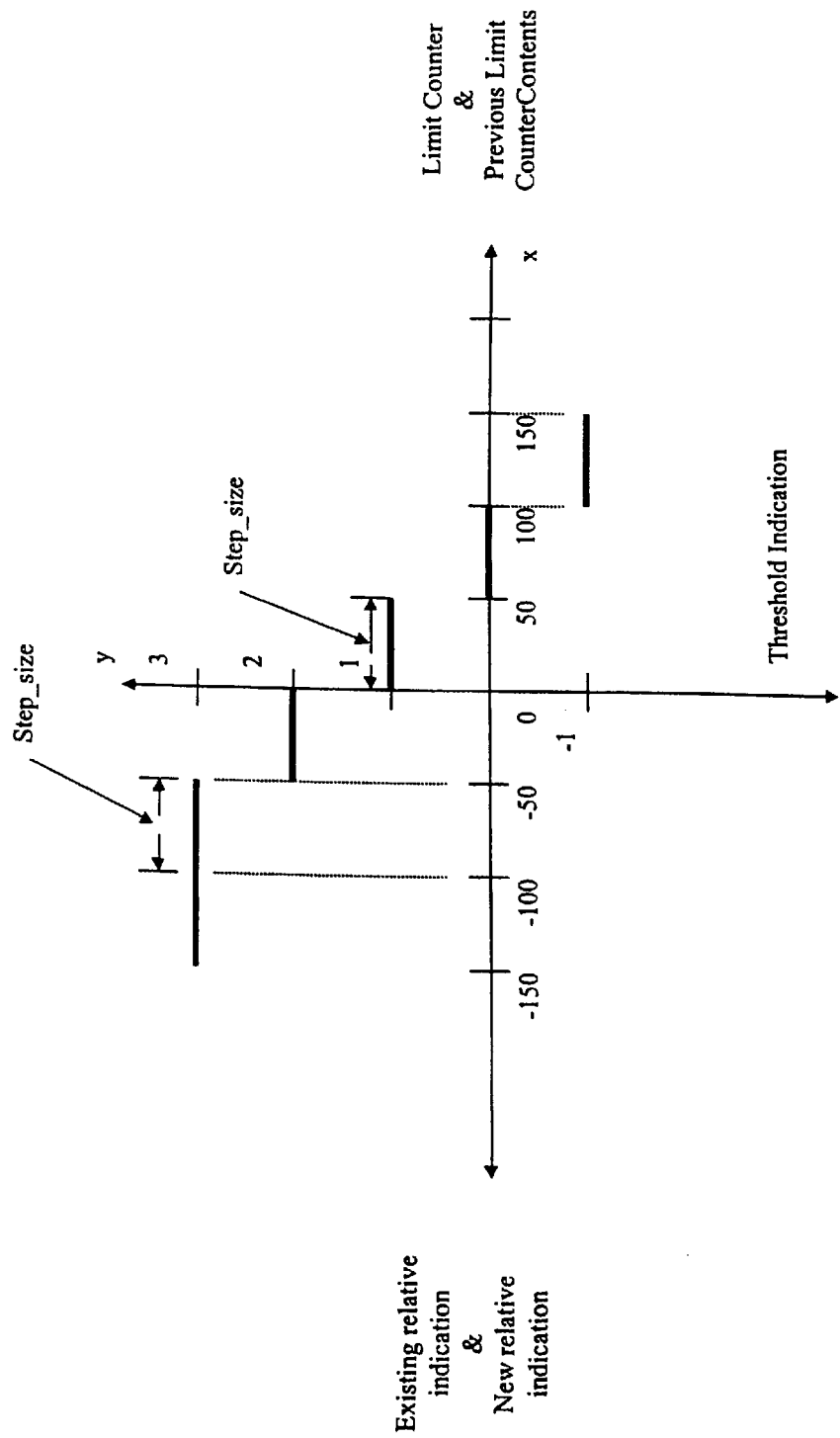
FIG. 4 is a diagram illustrating the relationship between four values used in controlling a confidence population for an alternate embodiment in accordance with this invention.

In an alternative embodiment of this invention, control apparatus 10 controls the population size of high-confidence assignments. For such an embodiment, limit counter 16 decrements by m whenever a confidence level prediction is generated and increments by p whenever a high-confidence assignment is generated. FIG. 4 illustrates the division of the contents of limit counter 16 into sub-ranges for a control apparatus 10 configured to control the population of high-confidence assignments.

The foregoing has described a control apparatus 10 where the low-confidence assignment population is controlled relative to a reference population of confidence level predictions. In an alternative embodiment in accordance with this invention, control apparatus 10 controls the low-confidence population relative to another reference population such as the total number of instructions, branch instructions or otherwise. In such an alternative embodiment, limit counter 16 may decrement by m on the occurrence or execution of any instruction. Consequently, the triggering event for limit counter 16 is execution of any instruction, rather than generation of a confidence level prediction.

Figure 5:
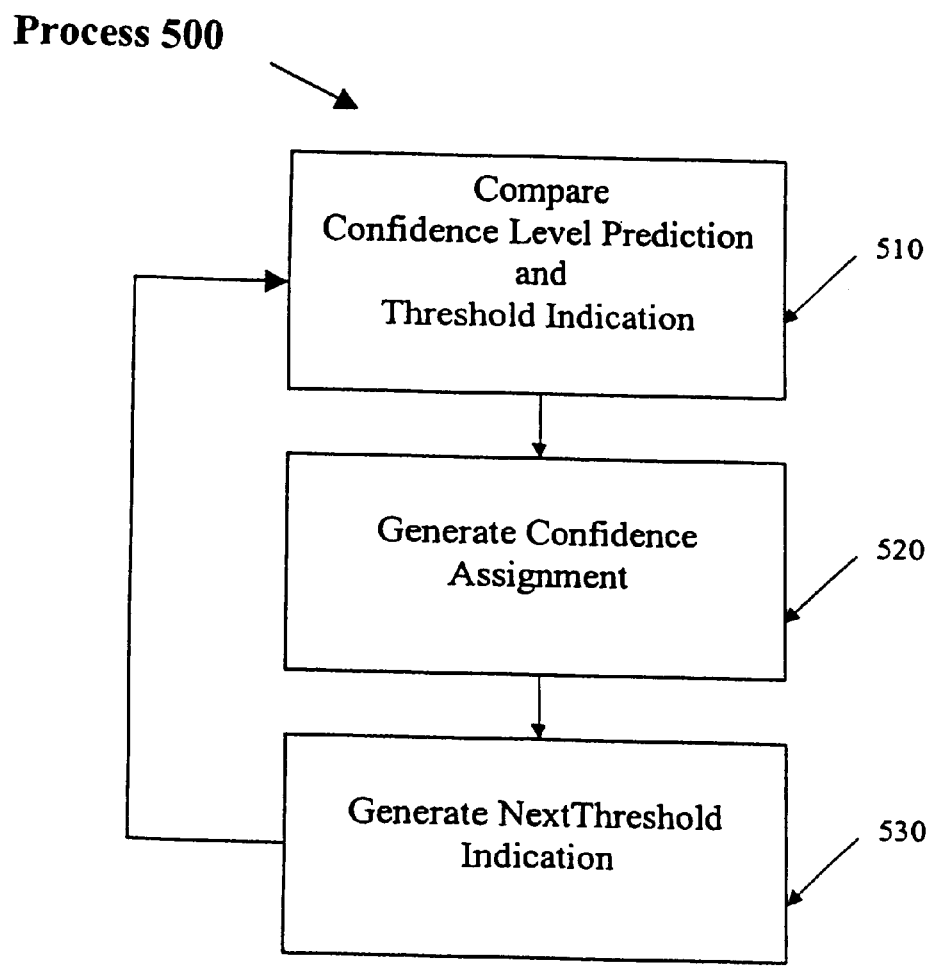
FIG. 5 is a flow chart illustrating a method for dynamically controlling the population size of confidence assignments.

FIG. 5 illustrates a process 500 for dynamically controlling the population size of confidence assignments in accordance with one embodiment of this invention. The description of rel_pop_size and ob_rel_op_size at the beginning of this section is also applicable to the process described below and need not be repeated here. At block 510, a current confidence level prediction is compared with a current threshold indication. The current confidence level prediction provides an estimate of the probability of the occurrence (or non-occurrence) of a certain event (e.g., branch will be taken in a microprocessor executing a branch instruction). While process 500 can be used with confidence level predictions of branch instructions of a microprocessor, it should not be limited to such confidence level predictions. The description above of CLP 12, comparator 14, and threshold generator 30 in FIG. 1 is applicable here as well and need not be repeated. The confidence level prediction of block 510 can be generated by CLP 12 of FIG. 1, but should not be so limited. The threshold indication of block 510 can be generated by threshold generator 30 of FIG. 1, but should not be so limited. For example, process 500 can be practiced with confidence level predictions of threads in a multi-thread processor, or with confidence level predictions for a branch predictor in processor supporting eager execution. The current confidence level prediction has a value between 0 and max_conf, where max_conf is a positive integer. For purposes of illustration only, max_conf is 3 in this description but it should be appreciated that other values are possible. A confidence level prediction with a value of 0 indicates a low probability of an event occurring while a prediction with a value of max_conf indicates a high probability of an event occurring. Values in between 0 and max_conf indicate intermediate levels of probability of occurrence. It should be appreciated from the foregoing that in an alternative embodiment max_conf can be indicative of a low probability while 0 can be indicative of a high probability. The current threshold indication has a value between 0 and max conf. For purposes of illustration only, the current threshold indication has a value of 1, but it should be appreciated that other values are possible. The current threshold indication is a value that is used to give the current confidence level predictions a confidence assignment.

Depending on the result of the comparison in block 510, at block 520 a confidence assignment chosen from at least two confidence assignment population types is generated. The confidence assignment generated at block 510 can be produced by the comparator 14 of FIG. 1, but should not be limited to generation by such a device. For purposes of illustration only, at block 520 either a low-confidence assignment or a high-confidence assignment is generated. If the confidence level prediction is greater than the threshold indication, a high-confidence assignment is generated. Alternatively, if the confidence level prediction is less than or equal to the threshold indication, a low-confidence assignment is generated. It should be appreciated that by changing the threshold indication, the number of low-confidence assignments (or high-confidence assignments) can be controlled.

At block 530, the current confidence assignment is used to generate another (or next) threshold indication. The threshold indication generated at block 530 can be produced by threshold generator 30 of FIG. 1. The threshold indication can be used to control the ob_rel_pop_size of the confidence assignment population type being controlled by process 500. For a variety of reasons, including maintenance of a power budget or improving processor performance (e.g., number of instructions executed per cycle), it is desirable to have the ob_rel_pop_size for the confidence assignment population type being controlled by process 500 to be relatively close to rel_pop_size. As process 500 is repeated a multiple number of times for a sequence of confidence level predictions having values distributed between 0 and max_conf, at block 520 the confidence assignment population type being controlled will have confident assignments generated that have a certain ob_rel_pop_size. Process 500 can be used with values for rel_op_size that range from 0 to 1. For purposes of illustration, rel_pop_size to be achieved by process 500 is selected to be 0.1, but it is understood that other values can also be chosen. Block 530 is described below for the case where process 500 is used to control the population size of low-confidence assignments. The next threshold indication generated at block 530 is made greater than the current threshold indication in order to generate more low-confidence assignments if ob_rel_pop_size is significantly less than rel_pop_size. If, on the other hand, ob_rel_pop_size is significantly above rel_pop_size, the next threshold indication generated at block 530 is made less than the current threshold indication.

Block 530 will now be described below for the case where process 500 is used to control the population size of high-confidence assignments. The next threshold indication generated at block 530 is made less than the current threshold indication in order to generate more high-confidence assignments if ob_rel_pop_size (defined in terms of high-confidence assignments) is significantly less than rel_pop_size. If, on the other hand, ob_rel_pop_size is significantly above rel_pop_size, the next threshold indication is made greater than the current threshold indication in order to generate less high-confidence assignments.

Figure 6:
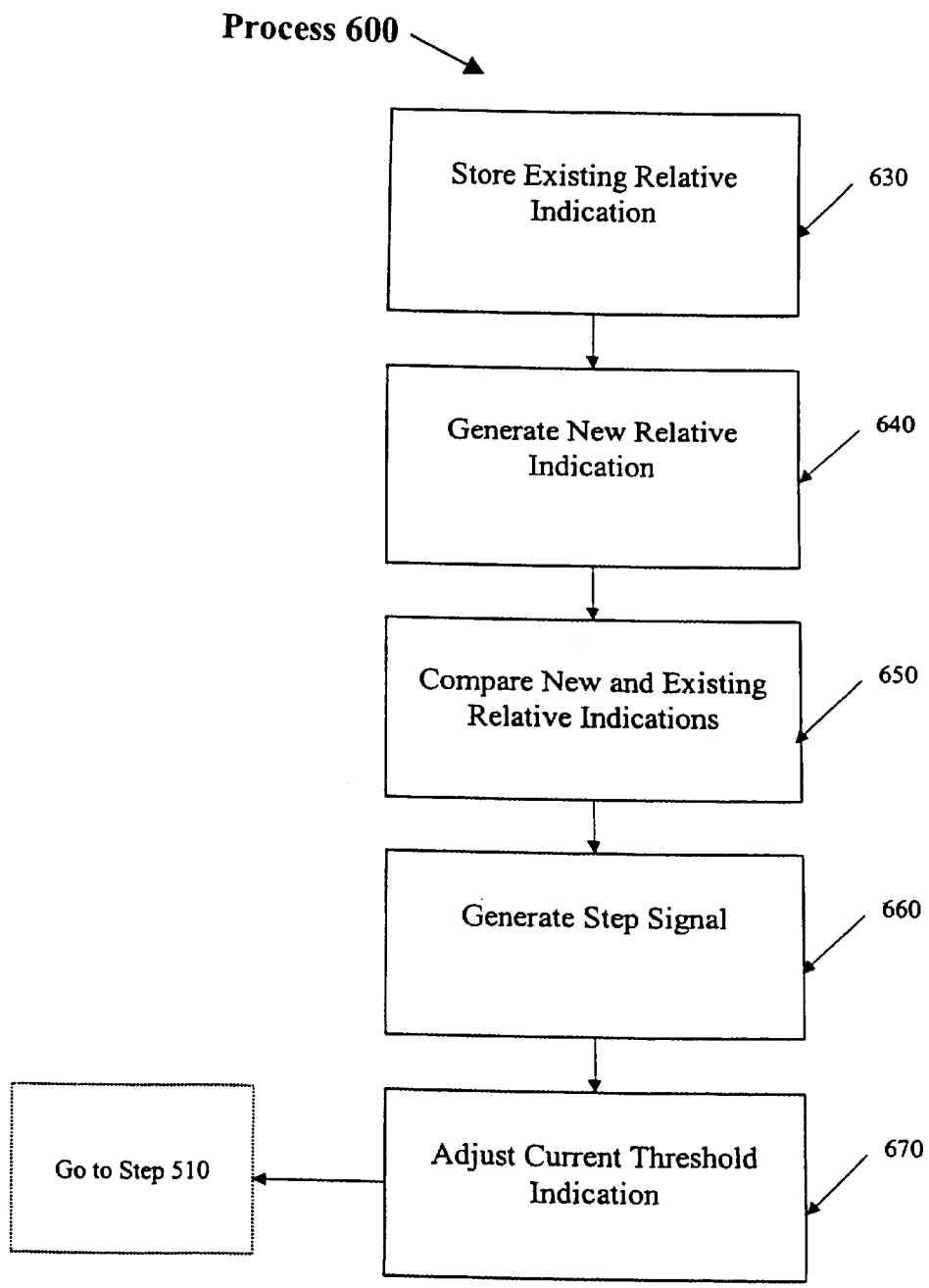
FIG. 6 illustrates a process for generating a threshold indication used to dynamically control the population size of confidence assignments in accordance with an embodiment of the present invention.

FIG. 6 illustrates a process for generating a threshold indication used to dynamically control the population size of confidence assignments in accordance with an embodiment of this invention. Process 600 generates the next threshold indication and is one method of performing block 530 of FIG. 5. The case where process 600 is generating the next threshold indication in order to control the ob_rel_pop_size for low-confidence assignments generated at block 520 is described below.

At block 630, the existing relative indication is stored in a register or counter. The existing relative indication is a value indicative of the difference between previous ob_rel_pop_size (previous observed relative population ratio) and the rel_pop_size, where the previous ob_rel_pop_size is the calculation of ob_rel_pop_size without including the current confidence assignment generated at block 520. The existing relative indication is the contents of limit counter 16 before the contents are adjusted to take into account the current confidence assignment. To take into account the current confidence assignment means that the indication of the difference between ob_rel_pop_size and rel_op_size includes the difference attributable to the current confidence assignment. Thus, the existing relative indication means that the indication of the difference between ob_rel_op_size and rel_op_size does not include the difference attributable to the current confidence assignment. An example of a register or counter for storing the existing relative indication is previous limit counter 18. The above description of previous limit counter 18 applies here as well and need not be repeated. The block of storing the existing relative indication also comprises retrieving the existing relative indication from a counter that maintains the relative indication between ob_rel_pop_size and rel_pop_size. An example of a counter that maintains the indication of the difference between ob_rel_op_size and rel_op_size is limit counter 16. The existing relative indication increases as the ob_rel_pop_size grows larger than the rel_pop_size. The existing relative indication decreases as the ob_rel_pop_size becomes smaller than the rel_pop_size.

At block 640 a new relative indication is generated. The new relative indication is the indication of the difference between the current ob_rel_pop_size (current observed relative population ratio) and rel_op_size, where the current ob_rel_pop_size is the calculation of ob_rel_pop_size that includes the current confidence assignment generated at block 520. Thus, the new relative indication takes into account the current confidence assignment.

At block 650, the new relative indication and the existing relative indication are compared. The new relative indication and the existing relative indication can be compared using step boundary detector 20 of FIG. 2. The above description of step boundary detector 20 is applicable here as well and need not be repeated. To perform the comparison at block 650, a relationship between the new relative indication, the existing relative indication, a step_size (or step size signal) and the threshold indication needs to be defined.

Step_size is defined as (1/rel_pop_size)*step_factor, where step_factor has some value such that step_size will be an integer. For purposes of illustration only, step_factor is selected to be 5. Other values for step factor can be chosen. The significance of smaller or larger values for step_factor (and consequently step_size) is described below. The existing relative indication and the new relative indication cover a range of possible values. The possible values that these indications can take ranges from +(1/rel_pop_size)*step_factor*max_conf to −(1/rel_pop_size) *step_factor*max_conf. The range of values that these indications can take is divided into non-overlapping sub_ranges or steps, each of which is equivalent to the step_size. Each sub_range has a threshold indication associated with it. FIG. 3 illustrates the relationship between the new relative indication, the existing relative indication, the step_size (or step size signal), and the threshold indication for the case where the ob_rel_pop_size for low-confidence assignments is controlled. Referring to FIG. 3, the x-axis represents the range of values that the existing relative indication and the new relative indication can have and depicts the projection along the x-axis of each sub-range. Referring to FIG. 3, the y-axis represents the threshold indication associated with each sub-range. The threshold indication associated with the sub-range in which the existing relative indication lies is defined as the existing threshold. The threshold indication associated with the sub-range in which the new relative indication lies is defined as the new threshold indication. At block 650, the existing relative indication and the new relative indication are compared in order to determine whether: 1) the existing threshold and new threshold indications are equivalent; 2) the existing threshold indication is larger than the new threshold indication; or 3) the existing relative indication is less than the new relative indication.

At block 660, a step signal is generated using the result of the comparison from block 650. If the existing and new threshold indications are equivalent, the step signal indicates no change is to be made to the current threshold indication. If the existing threshold indication is larger than the new threshold indication, the step signal indicates that the current threshold indication is to be decremented. If the existing threshold indication is smaller than the new threshold indication, the step signal indicates that the current threshold indication is to be incremented.

At block 670, the new threshold indication is generated using the step signal generated at block 660. The current threshold indication is incremented to generate the new threshold indication if the step signal indicates that the current threshold indication is to be incremented. The threshold indication is decremented to produce the new threshold if the step signal indicates that the current threshold indication is to be decremented. The new threshold indication has the value of the current threshold indication if the step signal indicates that no change is to be made to the current threshold indication.

It should be appreciated that the above processes may be performed within a processor or can be performed by a processor using a sequence of software instructions written in assembly language, C, C++, FORTRAN, BASIC, JAVA, or any other high or low-level language known in the art. For example, the above processes may be emulated on a computer system having a processor that executes instructions that effectuate the functionality of the processes.

Figure 7:
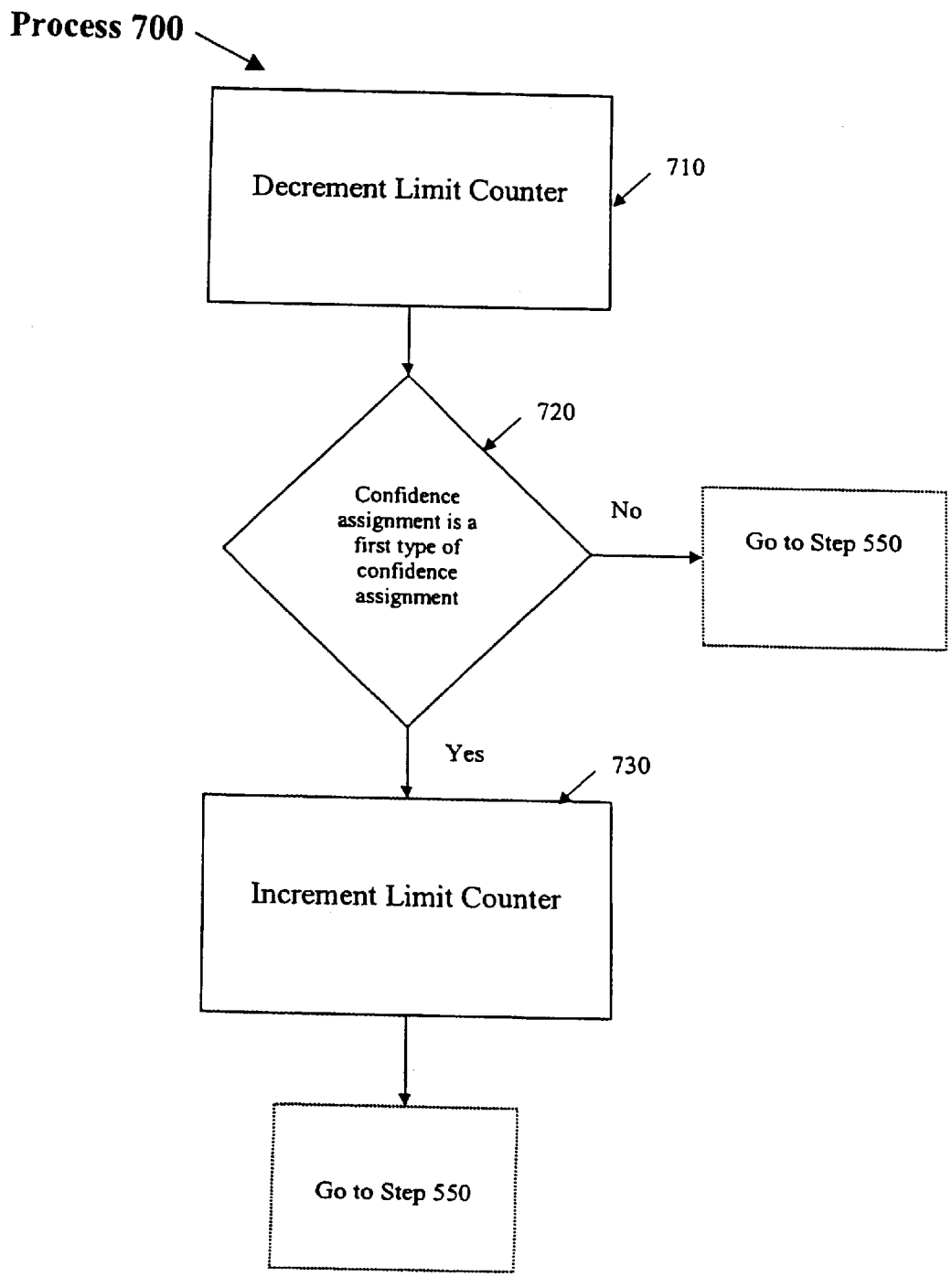
FIG. 7 illustrates a process for generating a relative indication between an observed relative population size ratio and a predetermined relative population size ratio in accordance with an embodiment of the present invention.

FIG. 7 illustrates a process 700 for generating a relative indication between an observed relative population size ratio (ob_rel_pos_size) and a predetermined relative population size ratio (rel_pop_size) in accordance with an embodiment of this invention. Process 700 is an example of a process for performing the block 640 of FIG. 6 in accordance with an embodiment of this invention. At block 710, a limit counter is decremented by a value m. A preferred derivation of the value m will be shown below. An example of the limit counter decremented at block 710 is the limit counter 16 of FIG. 2. If at block 720 the confidence assignment generated at block 520 is the type of confidence assignment (e.g., low-confidence assignment) for which process 500 is controlling the population size (or a first type of confidence assignment), process 700 proceeds to block 730. At block 730, the limit counter is incremented by p, where p is (1/rel_pop_size). It is preferable, but not necessary, that m and p are integers chosen such that m/p is equal to rel_pop_size. If, at block 720, the confidence assignment generated at block 520 is not the type of confidence assignment for which process 500 is controlling the population size, process 700 proceeds to block 550.

Figure 8:
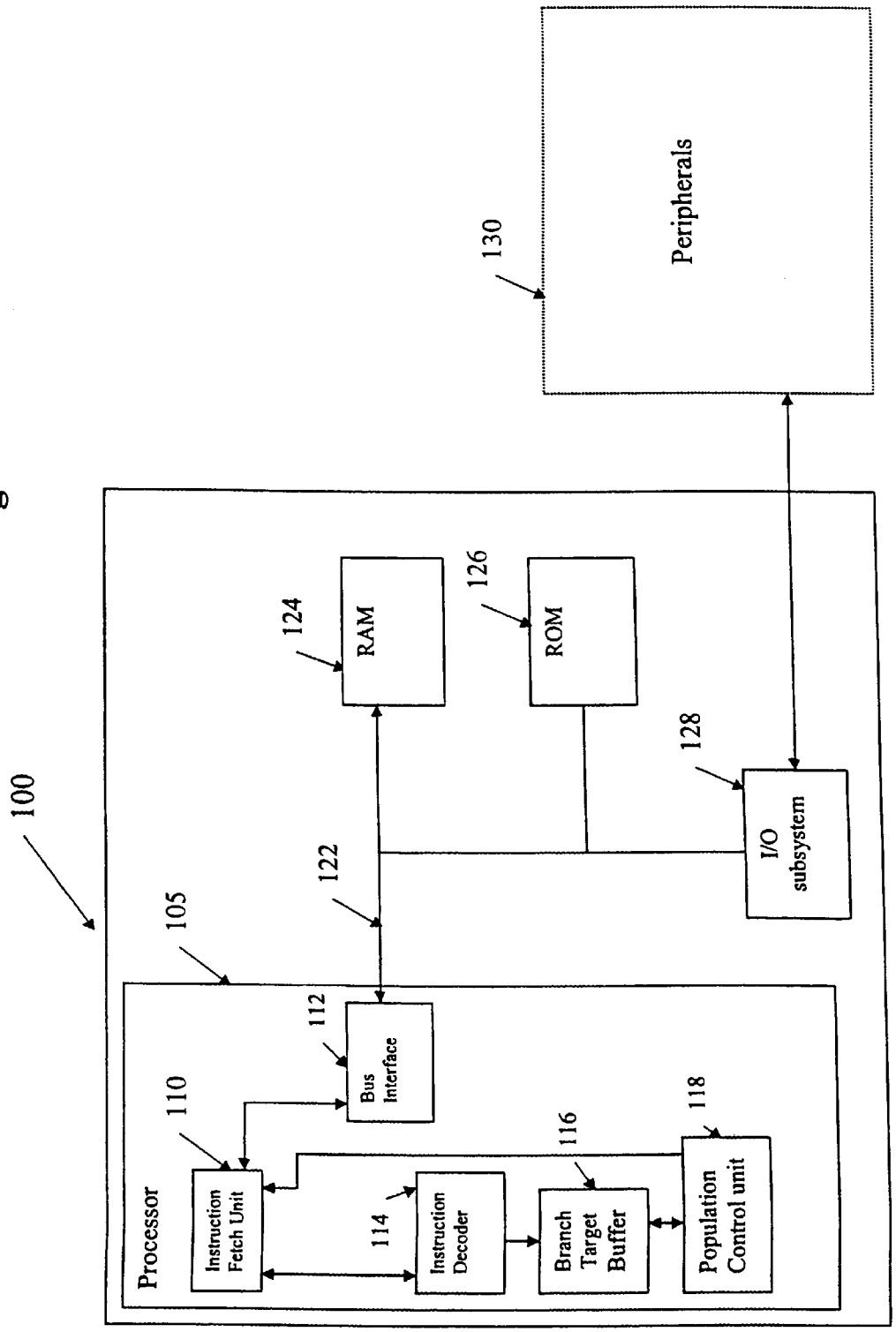
FIG. 8 illustrates a computing system having a processor employing a confidence assignment population control apparatus in accordance with an embodiment of the present invention.

FIG. 8 illustrates a computing system 100 having a processor employing a confidence assignment population control apparatus in accordance with an embodiment of this invention. Computing system 100 includes processor 105, data and address busses 122, random-access-memory (RAM) 124, read-only-memory (ROM) 126, input/output (I/O) subsystem 128, and peripherals 130. Processor 105 can be a microprocessor, controller or microcontroller, graphics processor or co-processor, or a digital signal processor. Processor 105 is coupled to both RAM 124 and ROM 126 through the data and address busses 122. RAM 124 and ROM 126 store instructions for execution by processor 105.

Additionally, RAM 124 can store data that can be modified by programs and instructions executed by processor 105. Processor 105, RAM 124, and ROM 126 are coupled to the I/O subsystem through data and address busses 122. I/O subsystem 128 serves as the interface between peripherals 130 and computing system 100. Peripherals 130 may include a video display device (not shown), printer (not shown), and/or disk drive (not shown). Data can be transferred from the processor 105, RAM 124, or ROM 126 through the data and address busses 122 to the I/O subsystem that transfers the data to the possible devices that make up peripherals 130.

Processor 105 includes instruction fetch unit 110, bus interface 112, instruction decoder (ID) 114, branch target buffer (BTB) 116, and population control unit (PCU) 118. An example of population control unit (PCU) 121 is control apparatus 10 of FIG. 2. The description above of confidence population control apparatus 10 is applicable here as well and need not be repeated. Instruction fetch unit (IFU) 110 retrieves instructions from RAM 124 or ROM 126 for execution by processor 105. IFU 110 is coupled to interface 112 which drives bus 122 with the appropriate signals for retrieving instructions and data from RAM 124 or ROM 126. ID 114 decodes instructions retrieved by IFU 110 in preparation for execution. BTB 116 receives a signal from ID 114 identifying a branch instruction to be executed. BTB 116 uses the signal received from ID 114 to generate prediction for the branch which will taken for the associated branch instruction. PCU 118 uses the prediction generated by BTB 116 in the manner described above for control apparatus 10.

Since power consumption is a major issue in many computer applications, including mobile computing, this invention provides in an embodiment a method and apparatus for limiting power consumption by controlling the population size of confidence assignments given to confidence level predictions. By controlling the population size of confidence assignments, the amount of speculative execution in a microprocessor can be controlled. Speculative execution improves microprocessor performance but also wastes power where the speculative execution involved misprediction of the path to be taken by a branch instruction. By conditioning speculative execution to branch instructions with high-confidence assignments where the likelihood of misprediction is small and by controlling the population size of low-confidence assignments, the power consumed by speculative execution can be controlled and the amount of wasted power decreased.

Additionally, this invention provides in an embodiment a method and apparatus for controlling the amount of eager execution by controlling the population size of confidence assignments. Being able to control the amount of eager execution helps improve the speed with which a microprocessor can execute instructions (i.e., instructions/cycle). Needless eager execution of both paths of a branch instruction consumes resources, thereby decreasing performance. By conditioning eager execution on branch instructions having a low-confidence assignment and by controlling the population of high-confidence assignments, the amount of eager execution can be controlled.

Thus, a method and apparatus for dynamically adjusting the population size of confidence assignments have been described. Although the present invention has been described with reference to specific embodiments, it will be appreciated by one of ordinary skill in the art that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A confidence assignment population control apparatus comprising:
   a comparator adapted to compare a current confidence level prediction and a current threshold indication and to generate a current confidence assignment; and
   a threshold generator to receive the current confidence assignment and to generate a next threshold indication.

2. The apparatus of claim 1, wherein the current confidence assignment is chosen from at least two types of confidence assignments.

3. The apparatus of claim 2, wherein the at least two types of confidence assignments include a low confidence assignment.

4. The apparatus of claim 2, wherein the at least two types of confidence assignments include a high confidence assignment.

5. The apparatus of claim 1, wherein the comparator is to compare a plurality of confidence level predictions and a plurality of threshold indications to generate a plurality of confidence assignments; and
   wherein the plurality of confidence assignments comprises a number of a first type of confidence assignment.

6. The apparatus of claim 5,
   wherein the threshold generator comprises a first counter; and
   wherein the counter is to maintain a new relative indication of a difference between a current observed relative population ratio and a predetermined relative population ratio; and
   wherein the new relative indication includes a difference attributable to the current confidence assignment.

7. The apparatus of claim 6,
   wherein the threshold generator comprises a second counter;
   wherein the second counter is to maintain an existing relative indication of a difference between a previous observed relative population ratio and the predetermined confidence assignment ratio; and
   wherein the existing relative indication does not include a difference attributable to the current confidence assignment.

8. The apparatus of claim 7, wherein the first type of confidence assignment is a low-confidence assignment.

9. The apparatus of claim 7,
   wherein the first counter is decremented by a predetermined value m on occurrence of a triggering event;
   wherein the first counter is incremented by a predetermined value p if the current confidence assignment is a first type of confidence assignment.

10. The apparatus of claim 7, wherein the first type of confidence assignment is a high-confidence assignment.

11. The apparatus of claim 7, wherein the first type of confidence assignment is a low-confidence assignment.

12. The apparatus of claim 7, wherein the triggering event is a confidence level prediction.

13. The apparatus of claim 7, wherein the triggering event is an instruction.

14. The apparatus of claim 7,
   wherein the threshold generator comprises a step indicator; and wherein the step indicator is to receive the existing relative indication and the new relative indication and to generate a step signal.

15. The apparatus of claim 14,
wherein the threshold generator comprises a threshold counter; and
wherein the threshold counter is to generate a new threshold indication.

16. The apparatus of claim 15,
wherein the new relative indication and the existing relative indication each has a range of possible values; and
wherein the range of possible values is divided into non-overlapping sub-ranges including a first sub-range and a second sub-range.

17. The apparatus of claim 16, wherein the threshold counter is decremented if the step signal indicates that the new relative indication is in the first sub-range and the existing relative indication is in the second sub-range.

18. The apparatus of claim 16, wherein the threshold counter is incremented if the step signal indicates that the new relative indication is in the second sub-range and the existing relative indication is in the first sub-range.

19. The apparatus of claim 15,
wherein the threshold counter is not changed if the step signal indicates that the first relative indication and the second relative indication are in the first sub-range.

20. The apparatus of claim 16,
wherein the step indicator is to receive a step size signal,
wherein the first sub-range and the second sub-range each have a sub-range size; and
wherein the step size signal controls the sub-range size.

21. A method for controlling the relative population size of confidence assignments given to confidence level predictions, the method comprising:
comparing a current confidence level prediction and a current threshold indication to
generate a current confidence assignment; and
generating a next threshold indication based on said current confidence assignment.

22. The method of claim 21, further comprising choosing the current confidence assignment from at least two types of confidence assignments.

23. The method of claim 21, wherein generating a next threshold indication comprises:
storing an existing relative indication;
generating a new relative indication;
comparing the new relative indication and the existing relative indication;
generating a step signal; and
adjusting the current threshold indication.

24. The method of claim 23, wherein generating a new relative indication comprises:
decrementing a limit counter on the occurrence of a confidence level prediction; and
incrementing a limit counter on the occurrence of a confidence assignment which is a first type of confidence assignment.

25. A computing system comprising:
a bus;
a memory coupled to the bus; and
a processor coupled to the bus and having a confidence assignment control apparatus including,
a comparator operable to compare a current confidence level prediction and a current threshold indication and to generate a current confidence assignment, and
a threshold generator to receive the current confidence assignment and generate a next threshold indication.

26. The computing system of claim 25, wherein the current confidence assignment is chosen from at least two types of confidence assignments.

27. The computer system of claim 26,
wherein the at least two types of confidence assignments include a low-confidence assignment;
wherein the threshold generator comprises a first counter;
wherein the first counter maintains a new relative indication of a difference between a current observed relative population ratio and a predetermined relative population ratio; and
wherein the new relative indication includes a difference attributable to the current confidence assignment.

28. A computer readable storage medium having stored thereon instructions which when executed by a processor result in:
comparing a current confidence level prediction and a current threshold indication to generate a current confidence assignment; and
generating a next threshold indication based on said current confidence assignment.

29. The computer readable storage medium of claim 28,
wherein the current confidence assignment is chosen from at least two types of confidence assignments.

30. The computer readable storage medium of claim 28, wherein generating a next threshold indication comprises:
storing an existing relative indication;
generating a new relative indication;
comparing the new relative indication and the existing relative indication; and
adjusting the current threshold indication.

* * * * *

UNITED STATES PATENT AND TRADEMARK OFFICE
CERTIFICATE OF CORRECTION

PATENT NO.   : 6,625,744 B1  
DATED        : September 23, 2003  
INVENTOR(S)  : Lihu Rappoport et al.

It is certified that error appears in the above-identified patent and that said Letters Patent is hereby corrected as shown below:

Column 14,  
Line 7, "comparator adapted to" should be -- comparator to --

Signed and Sealed this

Twenty-seventh Day of July, 2004

JON W. DUDAS  
*Acting Director of the United States Patent and Trademark Office*